United States Patent [19]

Trutter et al.

[11] Patent Number: 4,756,569
[45] Date of Patent: Jul. 12, 1988

[54] BACKREST FOR VEHICLE SEATS, ESPECIALLY MOTOR VEHICLE SEATS

[75] Inventors: Walter Trutter; Karl Stenz, both of Wiesbaden, Fed. Rep. of Germany

[73] Assignee: General Motors Corporation, Detroit, Mich.

[21] Appl. No.: 47,248

[22] Filed: May 6, 1987

[30] Foreign Application Priority Data

May 6, 1986 [DE] Fed. Rep. of Germany ....... 3615262

[51] Int. Cl.$^4$ ............................................. B60N 1/00
[52] U.S. Cl. ..................... 296/63; 297/417; 296/37.16
[58] Field of Search .................... 296/63, 65 R, 37.16, 296/195; 297/417; 270/452

[56] References Cited

U.S. PATENT DOCUMENTS

| | | | |
|---|---|---|---|
| 3,807,790 | 4/1974 | Erard | 297/379 |
| 4,286,819 | 9/1981 | Inoue et al. | 296/65 R |
| 4,637,648 | 1/1987 | Okino et al. | 296/63 |

FOREIGN PATENT DOCUMENTS 3322511 1/1983 Fed. Rep. of Germany .

Primary Examiner—Robert R. Song
Attorney, Agent, or Firm—Ernest E. Helms

[57] ABSTRACT

A backrest for vehicle seats, especially for the rear seats of motor vehicles, includes a forwardly foldable center arm rest and a backrest support member arranged in back of the center arm rest. The back rest support member can be locked to the vehicle body structure and, after being released from its locking engagement with the vehicle body, can also be folded forwardly so that a space is created in the region of the center arm rest that can be utilized as a loading hatch. To effect locking of the backrest support member to the vehicle body, a latch pin is provided which has lateral abutment portions and which is fixedly secured rearwardly of the backrest support member to the vehicle body. The free end of the latch pin extends through an aperture of the backrest support member. The latch pin is adapted to receive a rotatable knob which is attached thereto from the front side of the backrest support member. The knob has a sleeve portion with a central bore, and the wall of said bore is provided with lateral catch members which are adapted to cooperate, in the fashion of a bayonet lock, with the abutment portions of the latch pin.

14 Claims, 2 Drawing Sheets

BACKREST FOR VEHICLE SEATS, ESPECIALLY MOTOR VEHICLE SEATS

The invention relates to a backrest for motor vehicle seats, especially for the rear seats of motor vehicles, including a forwardly folding center arm rest, and a backrest support member arranged rearwardly of the arm rest. In order to provide a loading hatch in the region of the center arm rest, the backrest support member, upon release of the locking engagement with the vehicle body, is also adapted for forward swinging movement.

It has previously been proposed (see DE-OS No. 33 22 511) that in an arrangement including a center arm rest of the type that is mounted for pivotal movement on the backrest of a motor vehicle and is adapted to be recessed into that backrest, the recess for the arm rest be utilized as a loading hatch and be provided with a closure panel which is accessible from the trunk of the motor vehicle. The closure panel also serves as a support for the backrest. When the backrest support member is open and the center arm rest is folded down, an opening is provided through which bulky objects, such as skies, wood moldings or other elongate articles can be pushed, so that the occupant compartment becomes an extension of the trunk.

Furthermore, it has been conventional practice to provide motor vehicles with rear seat backrests which are adapted to be folded down in the forward direction, an arrangement which will also enable to increase the cargo capacity of the vehicle. Of course, swingable backrests of this type must include means which enables them to be locked to the body when folded back into their upright position to preclude accidental pivoting movement. Since the backrest support member, by virtue of the forwardly folding center arm rest, is easily accessible from the front in the area where the center arm rest is mounted, it has been conventional practice to arrange the backrest locking mechanism in this particular area. However, in accordance with the present state of the art, these prior art backrest locking mechanisms are unduly complex in design and expensive to manufacture.

It is the object of the present invention to provide an effective and functionally reliable releasable locking mechanism which is relatively simple in design. This object is achieved in accordance with the invention in that the locking mechanism provided for the backrest of the type described above includes a latch pin which is provided with lateral abutment portions and which is fixedly arranged on the body frame rearwardly of the backrest support portion, and in that the free end of the latch pin, which is provided with the abutment portion, is adapted, when the backrest support member is in the folded back position, for engagement into a recess of the backrest support member, and in that a turnable knob is provided which is adapted for engagement with the latch pin from the forwardly facing side of the backrest support member, said turning knob being provided with a sleeve portion having a central bore, and with the inner walls of said central bore being provided with lateral catch members which, upon actuation of the turning knob, cooperates in the fashion of a bayonet-type locking mechanism with the abutment portions of the latch pin.

The locking mechanism according to the invention is characterized by its simplicity of construction and functional reliability as well as its low cost and the simple procedure by which it can be installed. One particular advantage of this locking mechanism over prior art mechanisms of this type is that large manufacturing tolerances of the order of ±3 mm, caused by the installation of the backrest support member and welding inaccuracies, can be easily accommodated. Furthermore, the novel locking arrangement is preferable over prior art designs because it is neater and more pleasing to the eye.

In pursuing the basic concept of the invention to best advantage, it is proposed that the latch pin be provided with two lateral diagonally opposed abutment portions which are in the form of cam-like elements, and that there be provided on the inner wall of the turnable knob two catch members, which are also in the form of cam-like members and which, like the abutment portions of the latch pin, are arranged in diametrically opposed relationship, the arrangement being such that when the backrest is in the locked position, the catch members of the turnable knob are engaging the abutment portions of the locking pin from behind. Preferably, the cam-shaped abutment portions of the latch pin are tapered towards the turnable knob, and the cam-shaped catch members of the turnable knob are tapered towards the latch pin. The arrangement of providing complementary tapered engagement surfaces assists in the procedure of turning the turnable knob to its locking position and to thereby facilitate the manipulation of the locking mechanism.

In accordance with another advantageous feature of the invention which enables low-cost and simplified manufacture of the locking mechanism, the latch pin and the turning knob are in the form of plastic injection-molded parts, and the abutment portions and the catch members, as well as other associated elements, are integrally formed onto the latch pin and turning knob, respectively.

Other details and advantages of the invention will be apparent from the sub-claims and, in conjunction with the attached drawings, the following description of one exemplary embodiment.

Figure 1:
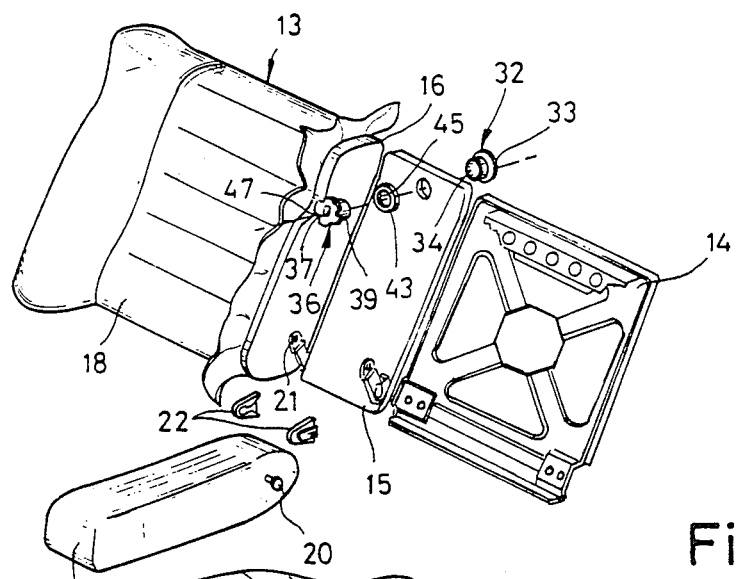
FIG. 1 is a perspective exploded view of a rear seat of a motor vehicle.
Figure 1:
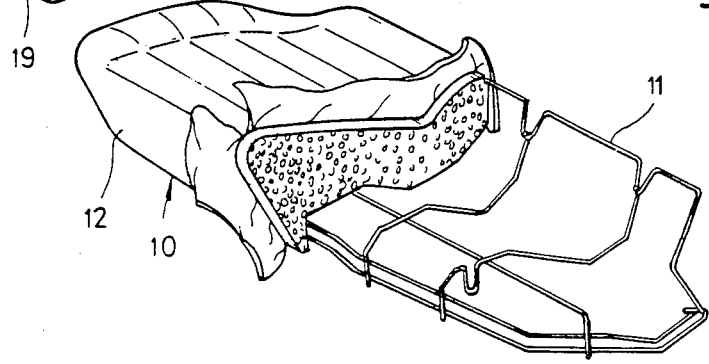

In FIG. 1, numeral 10 denotes a seat portion of a motor vehicle rear seat which is comprised of a seat frame 11 having arranged thereon a seat cushion 12 which is partially illustrated in section. Numeral 13 denotes the backrest of the vehicle seat 10. The backrest 13 is comprised of three sheet metal support members 14, 15 and 16 which are fastened to the vehicle body 17 (FIG. 2) and which are adapted for forward pivoting movement, either individually or in unison. The two outer sheet metal members 14 and 16 have arranged thereon a backrest cushion, one of them being shown in FIG. 1 and denoted by the numeral 18. Thus, the rear seat backrest is of the type including backrest portions which are adapted for individual forward swinging movement. However, in FIG. 1 the backrest 13 is depicted in the upright position.

As is also apparent from FIG. 1, there is provided in the region of the medially disposed support member 15 a pivotable and removable center arm rest 19. The means provided to enable removal and pivoting movement of the center arm rest are in the form of hinge elements 20, 21 and 22. The pivoting axis of the center arm rest 19 is located at 20. When in the upwardly pivoted position, the center arm rest 19 is accommodated in a recess created by the space between the back seat cushions and lies flat against the backrest support member 15.

As indicated earlier, the medially disposed backrest support member 15 (as well as the two other sheet metal support members 14 and 16 for the backrest 13) can be folded down separately into the horizontal position. Once the center arm rest 19 has been removed and the backrest support member 15 has been folded down, the vacant space between the two backrest cushions forms an opening to the trunk (FIG. 2) which can be utilized as a loading hatch for bulky articles. However, when in the normal position, i.e., in the folded back position, the backrest support member 15 is, as mentioned above, locked to the body, so that during the operation of the vehicle inadvertent automatic forward pivoting of the backrest support member 15 and/or arm rest 19 is prevented.

Figure 2:
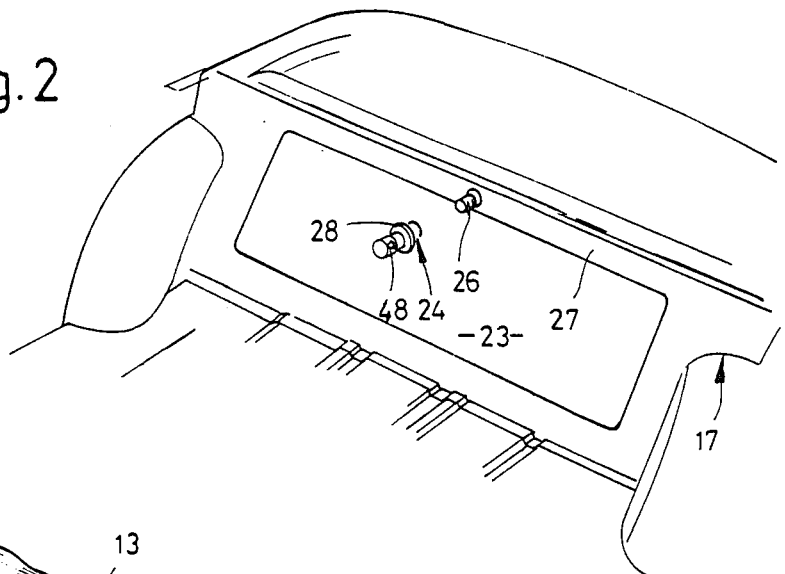
FIG. 2 is a perspective view, according to FIG. 1, of a motor vehicle body in the region of a rear seat, with the rear seat having been omitted.
Figure 3:
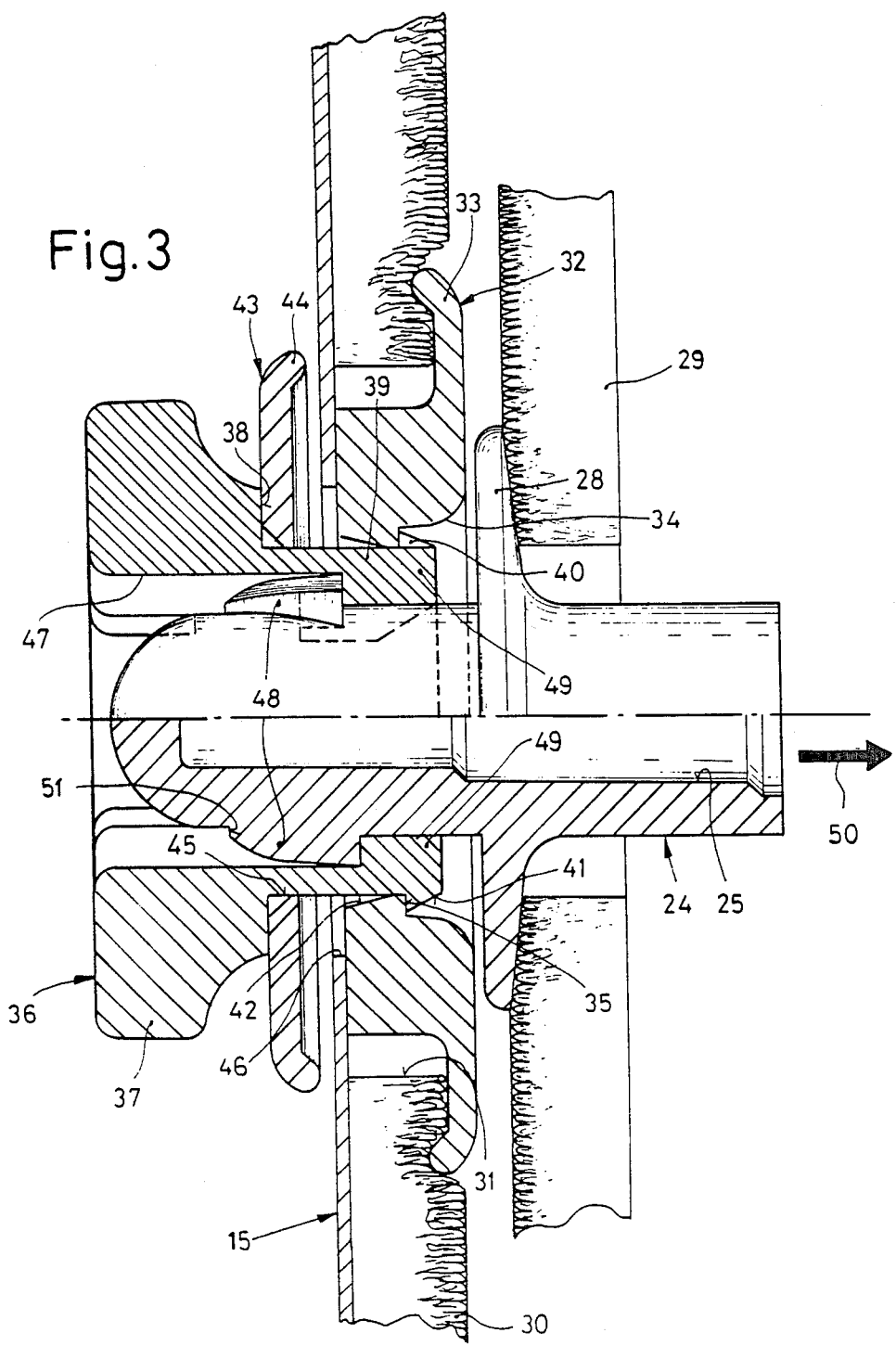
FIG. 3 is a rear seat backrest mechanism, illustrated partially in vertical section and, as compared to FIGS. 1 and 2, at an enlarged scale.

The construction, arrangement and operation of the locking mechanism for the backrest support member will be apparent from FIG. 3. The locking assembly includes a latch pin 24 which is of the sleeve-type design and is provided with an axial bore 25. The bore 25 of the latch pin 24 cooperates with a metallic retaining bolt 26 (FIG. 2) which, as illustrated in FIG. 2, is welded to the metal frame of the utility shelf. The metallic retaining bolt 26 is provided with a screw thread, which is of the ordinary type and therefore not illustrated, and its free end is knurled. If now the latch pin is fitted to the metallic retaining bolt 26, the two elements will become interlocked and fixedly secured to each other so as to prevent relative axial as well as circumferential movement. In FIG. 3 the metallic retaining bolt 26, which is adapted to engage the bore 25 of the locking pin 24, has been omitted. As is also apparent from FIG. 2, and especially from FIG. 3, the latch pin 24 has a flange-like collar 28 which, when the latch pin 24 and retaining bolt 26 are interlocked, abuts against a carpet-like covering of the utility shelf.

FIG. 3 also shows that the back of the backrest support member 15 is covered with a fabric lining 30 which is provided with a circular aperture 31 for insertion of a locking ring 32. The locking ring 32 is provided with a flange-like forwardly-bent edge 33 which bears against the fabric lining 30 of the backrest support member 15. Furthermore, the locking ring 32 is provided with a recess 34. The recess 34 is concentric with the recess 31 and has an inwardly oriented circumferential collar 35 formed thereon. The locking ring 32, or more particularly its central recess 34 and the collar 35 are adapted to cooperate with a turning knob assembly 36 in a manner which is apparent from FIG. 3. The turning knob 36 is comprised of a manually operable handle 37 which is diametrically enlarged at 38 and has a sleeve portion 39 which cooperates and is connected with the latch ring 32 as described in the following. The sleeve portion 39 is provided at its free end with a plurality of circumferentially spaced-apart catch members 40 which, in the assembled position illustrated in FIG. 3, engage the collar 35 of the locking ring 32 from behind. This will accomplish that the knob 36, while remaining rotatable, is non-releasably fixed in axial direction relative to the retaining ring 32 and thus the backrest support member 15. In order to be able to move the rotatable knob 36 into the position illustrated in FIG. 3, the catch members 40 are provided with tapered engagement surfaces 41 which are adapted to cooperate with a suitably contoured surface 42 on the locking ring 32.

The locking position of the knob 36 is also determined by a dish-like sliding ring 43 which, similar to the locking ring 32, is provided with a rim portion 44 that is bent in the direction of the backrest support member. The sliding ring 43 is also provided with a central aperture 45 through which is extending the sleeve portion 39 of the knob 36. At the same time, the sleeve portion 39 also extends through a circular aperture 46 in the backrest support member 15.

It should be appreciated that the function of the knob 36 is not only that of cooperating with the parts 32 and 33 as described in the foregoing. Instead, the knob 36 serves primarily as a counterlocking element for the latch pin 24 mentioned and described earlier. As illustrated in FIG. 3, the latch pin 24 extends with its forwardly directed free end into a cylindrical bore 47 of the knob 36. This position characterizes the locking position between the latch pin 24 and the knob 36. For this purpose, the latch pin 24 is provided with two radially outwardly projecting diametrically opposed cam-like abutment portions 48 which are integrally formed thereon, and the knob 36 has integrally formed on the wall of its bore 47 two diametrically opposed catch members 49 which are adapted to cooperate with the abutment portions 48 of the latch pin 24. The catch members 49, which are also cam-shaped, are adapted to engage, in the position illustrated in FIG. 3, the cam-shaped abutment portions 48 of the latch pin 24, so that the latch pin 24 cannot be axially displaced (arrow 50) anymore out of the knob 36. On the other hand, since the knob 36 is connected, as described earlier, with the backrest support member 15, this also means that when the backrest support member 15 is in the foldedback position it is securely locked to the vehicle body.

In order to effect disengagement of the locking members it is only necessary to turn the knob 36 by about 60° until the cam-shaped abutment portions 48 become disengaged from the cam-shaped catch members 49. This will enable the backrest support member 15 to be pivoted forwardly. If it is desired to re-establish the locking position, the sequence is reversed, i.e., the knob 36 is first turned into a position which enables the cam-shaped catch members 49 to be moved passed the cam-shaped abutment portions 48 of the latch pin 24. To facilitate this procedure, the cam-shaped abutment portions 48 of the latch pin 24 have been provided with arrow-shaped tips which are tapered towards the knob 36 and the cam-shaped catch members 49 of the knob 36 with arrow-shaped tips which are pointing in the direction of the latch pin 24. The arrow-like configuration of the abutment portions 48 is readily discernible in FIG. 2. Upon assuming its final axial position, which is determined by a stop member 51 inside the bore 47 of the knob 36, the knob 36 must be turned until its cam-shaped catch member 49 engage the cam-shaped abutment portions 48 of the latch pin 24, as illustrated in FIG. 3.

It should also be noted that the parts for the locking mechanism described above, i.e., latch bolt 24, knob 36, locking ring 32 and sliding ring 43, including all portions integrally formed thereon, can be manufactured by the injection molding technique and are made, preferably, all from the same plastic material, which will simplify manufacture and reduce costs to a minimum.

The embodiments of the invention in which an exclusive property or privilege is claimed are defined as follows:

1. Backrest for vehicle seats, especially for the rear seats of motor vehicles, including a fold-down center arm rest, and a backrest support member arranged rearwardly of the center arm rest and adapted for locking engagement with the vehicle body which, for the purpose of providing a loading hatch in the region of the center arm rest, is also adapted to be swung out forwardly upon release of the locking engagement, characterized in that locking engagement of the backrest support member 15 to the vehicle body is effected by means of a latch pin 24 provided with lateral abutment portions 48 and fixedly secured rearwardly of the backrest support member 15 (at 26, 27) to the vehicle body, and in that the free end of the latch pin 24, which is provided with the abutment portions 48, is adapted to extend through an aperture 31, 46 in the backrest support member 15, and in that a rotatable knob 36 is adapted to be attached from the front of the backrest support member 15 to the latch pin 24, said knob 36 being provided with a sleeve portion 39 having a central bore 47 which has lateral catch members 49 arranged at its wall, the arrangement being such that the catch members 49, upon turning of the knob 36, are caused to cooperate with the abutment portions 48 of the latch pin 24 in a manner similar to the operation of a bayonet lock.

2. Backrest according to claim 1, characterized in that the latch pin 24 is provided with a pair of lateral diametrically opposed cam-shaped abutment members 48, and in that on the inner wall 47 of the knob 36 there are arranged, also in diametrically opposed relationship, a pair of cam-shaped members 49 which, when the assembly is in the locking state, are engaged by the cam-shaped abutment portions 48 of the latch pin 24.

3. Backrest according to claim 1 and 2, characterized in that the cam-shaped abutment portions 48 of the latch pin 24 are provided with arrow-shaped tips which are pointed in the direction of the knob 36, and the cam-shaped catch members 49 of the knob 36 with like tips which are pointed in the direction of the latch pin 24.

4. Backrest according to claim 1, characterized in that on the end of the inner knob wall 47 facing away from the catch members 49 there are provided stop means 51 for fixing the locking position assumed by the latch pin 24 and knob 36.

5. Backrest according to claim 1, characterized in that the latch pin 24 and the knob 36 are injection molded parts made from plastics, and the abutment portions 48, the catch members 49 and other associated elements of the latch pin 24 and knob 36 are integrally formed thereon.

6. Backrest according to claim 1, characterized in that in the opening 31 of the backrest support member 15, 30 there is arranged a locking 32 which bears, by way of its flange-like rim portion 33, against the back of the backrest support member 15, and which has an aperture 34 arranged in concentric relationship with the aperture 31, 46 of the backrest support member 15 through which the sleeve portion of the knob 36 extends from the front and, when the assembly is in the locked state, the latch pin 24 extends from the rear.

7. Backrest according to claim 6, characterized in that the sleeve portion 39 of the knob 36 is adapted for non-releasable locking engagement with the locking ring 32 in a manner which enables rotatable movement but which prevents axial displacement.

8. Backrest according claim 6, characterized in that the locking ring 32 is a plastic injection-molded part and has a collar 35 which is integrally formed thereon inside the aperture 34, and which serves as a stop means for fixing the knob 36 in its axial position, and in that the knob sleeve 39 has integrally formed on the free end thereof a plurality of catch members 40 which are provided with tapered engagement surfaces 41 and which, when the knob 36 is in the interlocked position, are engaging the collar from behind.

9. Backrest according to claim 1, characterized in that intermediate the knob 36 and the backrest support member 15 there is arranged a sliding ring 43 through which extends the sleeve portion 39 of the knob 36 and against which bears, by way of the shoulder 38, the handle 37 of the knob 36.

10. Backrest according to claim 9, characterized in that the sliding ring 43 is also an injection molded plastic part, and the latch pin 24, knob 36, locking ring 32 and sliding ring 43, including the functionally associated members and elements integrally formed thereon, are all made of the same material.

11. Backrest according to one or more of the claim 1, characterized in that the rim portions 33 and 44 of the locking ring and the sliding ring 43, respectively, are bent in a dish-like manner towards the backrest support member 15.

12. Backrest according to claim 1, characterized in that the latch pin 24 is of sleeve-like construction and adapted to be non-releasably fitted to a metallic retaining bolt 26 which is fastened, preferably by welding, to the vehicle body (FIG. 2).

13. Backrest according to claim 12, characterized in that the metallic retaining bolt 26 is provided with a screw thread for the purpose of fixing the latch pin 24 axially in position, and a knurl is provided at the free end of the retaining bolt 26 to fix the latch pin 24 in non-rotatable relationship thereto.

14. Backrest according to claim 1, characterized in that the rearward end of the latch pin 24 extends through an aperture in the utility shelf 27, 29 and the flange-like collar 28, which is integrally formed onto the latch pin 24, is bearing against the front side of the utility shelf panel.

* * * * *